US011592290B2

(12) United States Patent
Na (10) Patent No.: US 11,592,290 B2
(45) Date of Patent: Feb. 28, 2023

(54) APPARATUS OF MEASURING VOLUME OF OBJECT AND METHOD THEREFOR (71) Applicant: ELECTRONICS AND TELECOMMUNICATIONS RESEARCH INSTITUTE, Daejeon (KR)

(72) Inventor: Dong Gil Na, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 199 days.

(21) Appl. No.: 17/202,768

(22) Filed: Mar. 16, 2021

(65) Prior Publication Data
US 2021/0356265 A1 Nov. 18, 2021

(30) Foreign Application Priority Data
May 12, 2020 (KR) .......................... 10-2020-0056486

(51) Int. Cl.
G01B 11/02 (2006.01)
G01B 21/08 (2006.01)
G01G 19/00 (2006.01)
H04Q 9/00 (2006.01)

(52) U.S. Cl.
CPC .............. G01B 21/08 (2013.01); G01B 11/02 (2013.01); G01G 19/002 (2013.01); H04Q 9/00 (2013.01); H04Q 2209/40 (2013.01)

(58) Field of Classification Search
CPC ........... G01B 21/08; G01B 11/02; H04Q 9/00
See application file for complete search history.

(56) References Cited

U.S. PATENT DOCUMENTS 6,614,928 B1  9/2003 Chung et al.
2014/0195451 A1 7/2014 Song et al.

FOREIGN PATENT DOCUMENTS

| CN | 1659419 A | * | 8/2005 | ............... B07C 1/00 |
| CN | 212110267 U | * | 12/2020 | |
| KR | 10-2012-0116247 A | | 10/2012 | |
| KR | 10-1331923 B1 | | 11/2013 | |
| KR | 10-2015-0084428 A | | 7/2015 | |
| KR | 10-2017-0027003 A | | 3/2017 | |
| KR | 10-1791934 B1 | | 11/2017 | |
| KR | 10-2041503 B1 | | 11/2019 | |

* cited by examiner

Primary Examiner — Jamel E Williams
(74) Attorney, Agent, or Firm — LRK Patent Law Firm (57) ABSTRACT Disclosed herein are an apparatus and method for measuring a volume of an object. The object volume measuring apparatus includes an area measuring unit that includes a detection sensor, which is arranged at predetermined spacing in a single row along lengthwise edges and widthwise edges of a plate respectively, where an object is placed, measures a length and a width according to the numbers of detection sensors lengthwise and widthwise respectively in which the edges are detected, and calculates an area of the object according to the measured length and width, a height measuring unit that is located above the plate and comprises a distance measuring sensor for measuring a height of the object when the object is placed, and an object calculation unit for calculating a volume of the object based on the area and the height.

12 Claims, 4 Drawing Sheets

FIG. 5

APPARATUS OF MEASURING VOLUME OF OBJECT AND METHOD THEREFOR

CROSS REFERENCE TO RELATED APPLICATION

The present application claims priority to Korean Patent Application No. 10-2020-0056486, filed May 12, 2020, the entire content of which is incorporated herein for all purposes by this reference.

BACKGROUND OF THE INVENTION

1. Field of the Invention

The present disclosure relates to an apparatus and method for measuring a volume of object, and more particularly to an apparatus and method for measuring a volume of object that more conveniently and simply obtain information on the length, width and height of object by being linked to an existing face-to-face reception system.

2. Description of Related Art

When receiving a parcel, a charge is determined based on the volume (sum of length, width and height) of the parcel. However, the accuracy of charge estimation tends to decrease because the face-to-face service has difficulty in accurately measuring the volume. When a parcel is received at desk, a receiving clerk measures the parcel size by means of a tape measure. Such a manual method is widely used.

In a related art concerning the volume measurement of objects such as parcels, volumes are measured using images obtained from a camera installed overhead or a distance measuring sensor.

The related art described above is applied to an unattended complex reception unit for calculating a charge, and another related art is utilized for an independent unit in a parcel reception environment.

Although the related arts are suitable for an unattended automatic unit that operates independently, they have limitations of cost or installation space for being applied to an environment providing a face-to-face service to customers. In addition, when the existing parcel delivery/postal service providers already have a reception device or system like scale, a low-cost unit only for requesting volume measurement and providing results is required instead of an integrated system with additional function of volume measurement.

SUMMARY OF INVENTION

The present disclosure is directed to provide a method and apparatus for measuring a volume of object that more conveniently and simply obtain information on the volume of object by being linked to an existing face-to-face reception system.

The technical objects of the present disclosure are not limited to the above-mentioned technical object, and other technical objects that are not mentioned will be clearly understood by those skilled in the art through the following descriptions.

According to the present disclosure, there is provided an object volume measuring apparatus comprising an area measuring unit that comprises a detection sensor, which is arranged at predetermined spacing in a single row along lengthwise edges and widthwise edges of a plate respectively, where an object is placed, measures a length and a width according to the numbers of detection sensors lengthwise and widthwise respectively in which the edges are detected, and calculates an area of the object according to the measured length and width; a height measuring unit that is located above the plate and comprises a distance measuring sensor for measuring a height of the object when the object is placed; and a volume calculation unit for calculating a volume of the object based on the area and the height.

According to the embodiment of the present disclosure, the object volume measuring apparatus may further comprise a communication unit for communicating with a reception system that requests volume measurement and receives a result value from the object volume measuring apparatus, wherein the communication unit communicates wirelessly with the height measuring unit and transmits wirelessly a message related to the request to the height measuring unit according to the request for volume measurement.

According to the embodiment of the present disclosure, the detection sensor may be composed of an illumination sensor or a push sensor.

According to the embodiment of the present disclosure, when the detection sensor is an illumination sensor and an end of the object covers a portion of the detection sensor in a direction in which the edge extends, each of the length and the width may be calculated, based on the number of the covered detection sensor and an illumination level of the detection sensor, of which the portion is covered, as any one value between an arrangement number of a partially covered detection sensor and an arrangement number of a next detection sensor.

According to the embodiment of the present disclosure, the object volume measuring apparatus may further comprise a scale under the plate for measuring a weight of the parcel.

According to the embodiment of the present disclosure, the distance measuring sensor may be composed of an ultrasonic sensor, an infrared sensor, or a ToF (Time of Flight) camera sensor.

According to another embodiment of the present disclosure, there is provided a method for measuring a volume of an object comprising: measuring a length and a width by a detection sensor, which is arranged at predetermined spacing in a single row along lengthwise edges and widthwise edges of a plate respectively, where an object is placed, according to lengthwise and widthwise numbers of the detection sensor where the edges are detected, as well as calculating an area of the object according to the measured length and width; measuring a height of the object by a distance measuring sensor that is located above the plate and measures the height of the object when the object is placed; and calculating a volume of the object based on the area and the height.

According to the embodiment of the present disclosure, the measuring of the height may start, at a request for volume measurement from a reception system, by receiving wirelessly a message related to the request.

According to the embodiment of the present disclosure, the detection sensor may be composed of an illumination sensor or a push sensor.

According to the embodiment of the present disclosure, when the detection sensor is an illumination sensor and an end of the object covers a portion of the detection sensor in a direction in which the edge extends, each of the length and the width may be calculated, based on the number of the covered detection sensor and an illumination level of the detection sensor, of which the portion is covered, as any one value between an arrangement number of a partially covered detection sensor and an arrangement number of a next detection sensor.

According to the embodiment of the present disclosure, the calculating of the area of the object may comprise measuring a weight of the object by a scale that is located under the plate.

According to the embodiment of the present disclosure, the distance measuring sensor may be composed of an ultrasonic sensor, an infrared sensor, or a ToF camera sensor.

The features briefly summarized above for this disclosure are only exemplary aspects of the detailed description of the disclosure which follow, and are not intended to limit the scope of the disclosure.

DETAILED DESCRIPTION OF THE INVENTION

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

Hereinafter, embodiments of the present disclosure will be described with reference to the accompanying drawings.

Referring to FIGS. 1 to 4, an apparatus for measuring a volume of object according to an embodiment of the present disclosure will be described.

Figure 1:
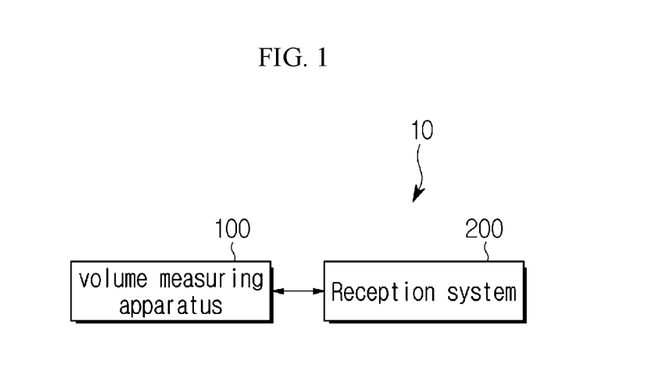
FIG. 1 is a block diagram showing a parcel system including an object volume measuring apparatus and a reception system according to an embodiment of the present disclosure.
Figure 2:
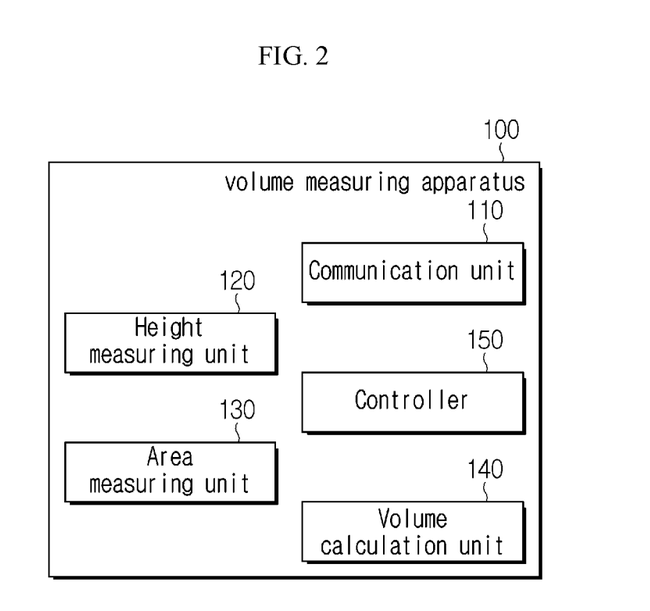
FIG. 2 is a block diagram showing an object volume measuring apparatus according to an embodiment of the present disclosure.
Figure 3:
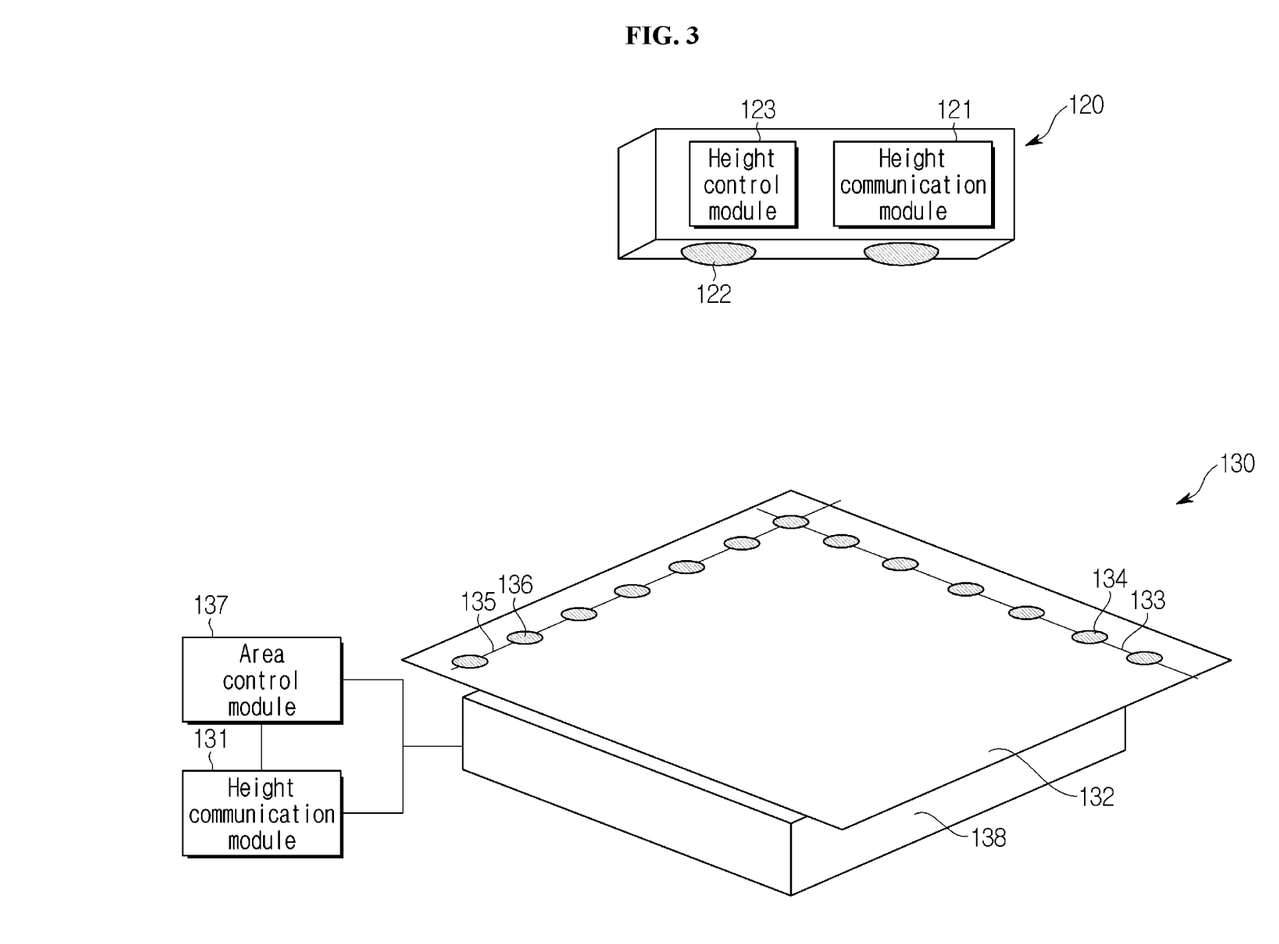
FIG. 3 is a view showing schematic configurations for a height measuring unit and an area measuring unit respectively.

FIG. 1 is a block diagram showing an object system including an object volume measuring apparatus and a reception system according to an embodiment of the present disclosure. FIG. 2 is a block diagram showing an object volume measuring apparatus according to an embodiment of the present disclosure. FIG. 3 is a view showing schematic configurations for a height measuring unit and an area measuring unit respectively. Hereinafter, an object to be measured volume will be described by exemplifying it as a package. However, the object to be measured is not limited to parcels, and of course, various types of products are possible.

A parcel system 10 is a system used by a receptionist for the face-to-face reception of a parcel in a convenient store, a parcel office or a post office, to measure the weight and volume of the parcel and to calculate a parcel rate. The parcel system 10 includes an object volume measuring apparatus 100 and a reception system 200.

The object volume measuring apparatus 100 measures, at a request of the reception system 200, the volume and weight of a parcel, when the parcel is placed, and transmits results to the reception system 200.

The reception system 200 may be a computer system that calculates and receives a parcel rate according to the transmitted results and processes the parcel. The reception system 200, being used by a receptionist, may be installed near the object volume measuring apparatus 100 and communicate with the object volume measuring apparatus 100 using wires or wirelessly.

Referring to FIG. 2 and FIG. 3, the object volume measuring apparatus 100 includes a communication unit 110, a height measuring unit 120, an area measuring unit 130, a volume calculating unit 140, and a controller 150.

The communication unit 110 may communicate the reception system using wires or wirelessly. When a parcel is placed on the object volume measuring unit 100, the communication unit 110 receives a request of volume measurement from the reception system 200 and transmits a result value in the object volume measuring apparatus 100 to the reception system 200. According to the request of the reception system 200, the result value may be the horizontal and vertical lengths or the area and height or the volume of the measured parcel. Also, the communication unit 110 may connected by wire to the height measuring unit 120 and the area measuring unit 130, and the communication unit 110 may transmit the result value to the controller 150 and the volume calculating unit 140 through wires. In another embodiment, for simplicity of apparatus, the communication unit 110 may be wireless connected to the height measuring unit 120 that is separately located above the area measuring unit 130. In the case of wireless connection, the communication unit 110 may transmit wirelessly a request-related message to the height measuring unit 120 according to a request of volume measurement.

The communication unit 110 may be composed of any one of TCP/IP communication via Ethernet device, http-based restful communication, and socket communication. Specifically, as a wired communication module, the communication unit 110 may be implemented with a power line communication device, a telephone line communication device, a cable home (MoCA), Ethernet, IEEE1294, an integrated cable home network, and an RS-485 control device. Also, as a wireless communication module, the communication unit 110 may be implemented with wireless LAN (WLAN), Bluetooth, HDR WPAN, UWB, ZigBee, Impulse Radio, 60 GHz WPAN, Binary-CDMA, wireless USB technology, wireless HDMI technology, and/or the like.

The height measuring unit 120 is separately placed above the area measuring unit 130. The height measuring unit 120 includes a height communication module 121 for transmitting and receiving a request-related message and a result values to and from the communication unit 110, a distance measuring sensor 122, and a height control module 123.

The distance measuring sensor 122 measures a height of a parcel, when the parcel is placed, and may be composed of, for example, an ultrasonic sensor, an infrared sensor or a ToF (Time of Flight) camera sensor.

The height control module 123 may command the distance measuring sensor 122 to measure a height by controlling the whole height measuring unit 120 and transmit a result value requested by the reception system 200 through the height communication module 121 and the communication unit 110.

Figure 4:
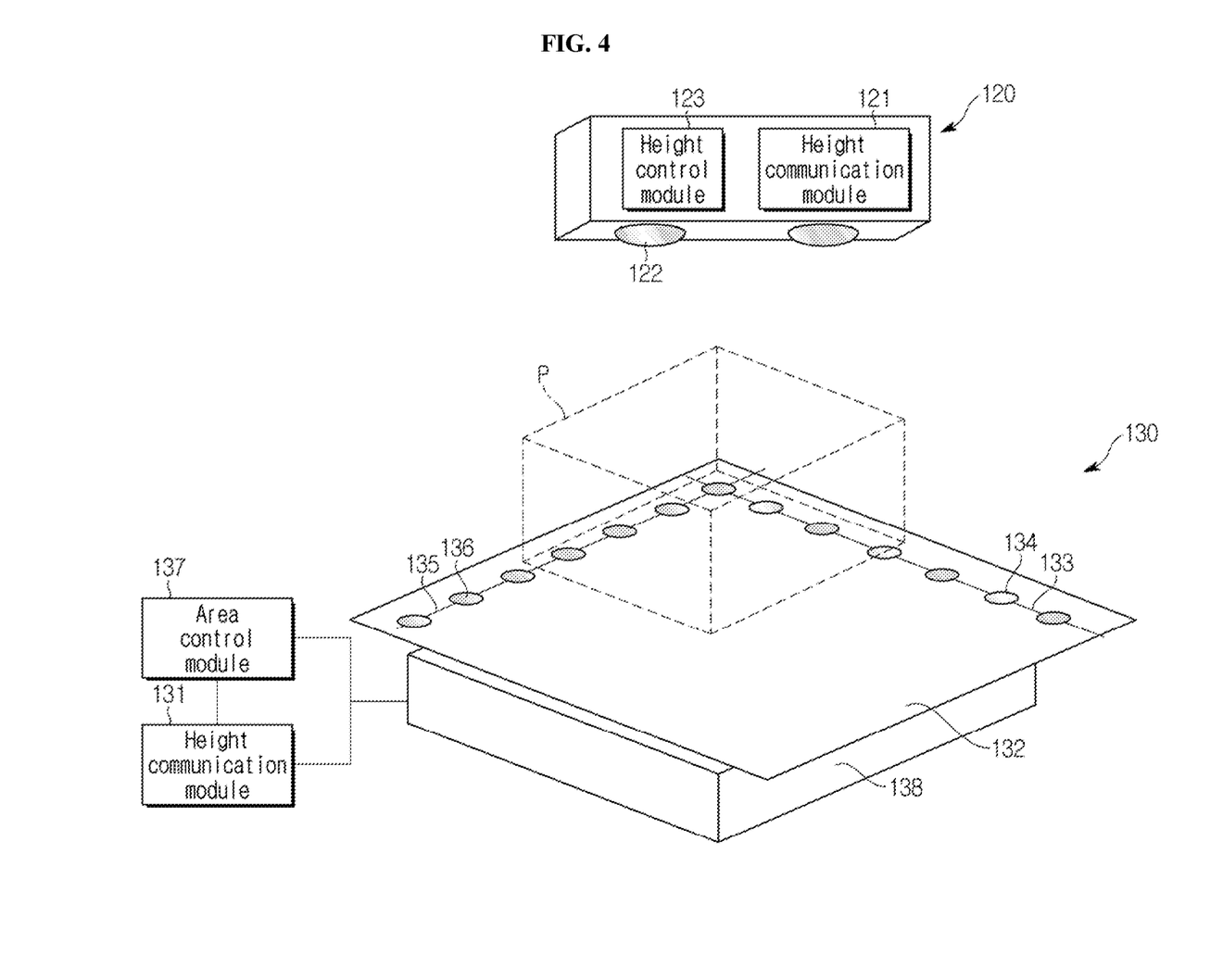
FIG. 4 is a view showing schematically the operations of a height measuring unit and an area measuring unit when an object is placed.

FIG. 4 is a view showing schematically the operations of a height measuring unit and an area measuring unit when an object is placed. Referring to FIG. 4, the height measuring unit 120 stores an initial distance, which is already stored, when a parcel (P) is not in the area measuring unit 130, and measures a placement distance to the top side of the parcel (P) using the distance measuring sensor 122, when the parcel (P) is placed at a volume measurement request of the reception system 200. The height measuring unit 120 calculates the height of the parcel (P) based on a difference between an initial distance and a placement distance.

The area measuring unit 130 may include an area communication module 131, a plate 132 on which a parcel (P) is placed, a lengthwise detection sensor 134, a widthwise detection sensor 136, an area control module 137, and a scale 138 placed under the plate 132.

The area communication module 131 transmits and receives a request-related message and a result value to and from the communication unit 110. The area control module 137 commands the detection sensors 134 and 136 to measure a length and a width by controlling the whole area measuring unit 130.

The lengthwise detection sensor 134 is placed along a lengthwise row 133 according to the lengthwise edges of the plate 132 and may be arranged in a single line at predetermined spacing. The widthwise detection sensor 136 is placed along a widthwise row 135 according to the widthwise edges of the plate 132 and may be arranged in a single line at predetermined spacing. The predetermined spacing may be 1 cm. The detection sensors 134 and 136 may be composed of an illumination sensor or a push sensor.

In case the detection sensors 134 and 136 are composed of an illumination sensor, the detection sensors 134 and 136 may detect whether or not a parcel (P) is placed and also measure ambient illumination at multiple levels. For example, in case a parcel (P) covers a portion of the detection sensors 134 and 136, the detection sensors 134 and 136 may detect the placement of the parcel (P) and also measure an illumination level corresponding to light that is incident upon the remaining portion not covered by the parcel.

The plate 132 may have a step-shaped parcel (P) position guide component (not illustrated) at lengthwise and widthwise edges so that the parcel (P) can be accurately placed to the lengthwise and widthwise rows 133 and 135 where the lengthwise and widthwise detection sensors 134 and 136 are arranged. As the detection sensors 134 and 136 are arranged in a single line according to the lengthwise row 133 and the widthwise row 135, not only the simplification of equipment is realized but also the parcel is rightly placed so that length and width can be accurately measured.

According to an instruction from the area control module 137, when the parcel (P) is placed on the plate 132 as shown in FIG. 4, the lengthwise detection sensor 134 detects a lengthwise edge of the parcel (P). Specifically, the lengthwise detection sensor 134 detects a parcel (P) end located in the direction of lengthwise edge. According to an instruction from the area control module 137, when the parcel (P) is placed on the plate 132 as shown in FIG. 4, the widthwise detection sensor 136 detects a widthwise edge of the parcel (P). Specifically, the widthwise detection sensor 136 detects a parcel (P) end located in the direction of widthwise edge.

The area control module 137 measures length and width according to the number of the detection sensors 134 and 136 lengthwise and widthwise, in which edges are detected, and calculates an area of parcel (P) according to the measured length and width.

When a parcel (P) end covers all the detection sensors in the direction where the widthwise edge stretches, as in the example of the widthwise row 135 of FIG. 4, the area control module 137 may calculate width as a value between the number of a covered widthwise sensor 136 (the fourth sensor in FIG. 4) and the number of a widthwise sensor 136 (the fifth sensor in FIG. 5) next to the covered widthwise sensor 136. This may be applied to a case in which the detection sensors 134 and 136 are illumination sensors. For example, when the distance between detection sensors is 1 cm, the width may be calculated as the median value of 4.5 cm, the truncated value of 4 cm or the rounded value of 5 cm according to a design specification.

In addition, when the detection sensors 134 and 136 are configured as illumination sensors and a parcel (P) end covers a portion of the detection sensor 136 in the direction extending along the widthwise row 135 of FIG. 4, the area control module 137 may calculate width using the arrangement numbers of partially covered detection sensor 136 and a next detection sensor 136 not covered at all, based on the number of the at least partially covered widthwise detection sensor 136 and an illumination level of the partially covered widthwise detection sensor 136. This considers a case in which a bottom end of parcel (P) covers some of the detection sensor 136 but the middle part of parcel (P) protrudes more than the bottom part because of an article and a packing type so that an actual width of the parcel (P) may be a value between a partially covered detection sensor 136 and a next detection sensor 136. Depending on how much the middle part of parcel (P) protrudes, the illumination level of the detection sensor 136 adjacent to the bottom end is different, and the area control module 137 may set each illumination level to correspond to a value between the arrangement number of a partially covered detection sensor and the arrangement number of a detection sensor that is not covered. For example, when a parcel (P) extends until the third widthwise detection sensor 136 of FIG. 4 and partially covers the fourth detection sensor 136, width may be calculated by adding values of adjacent detection sensors 136 corresponding to an illumination level of the fourth detection sensor 136 (i.e., the distance between the adjacent detection sensors 136 is 1 cm and a value corresponding to the illumination level is 0.3 cm) and a corresponding width corresponding to the four partially covered detection sensors 136 (i.e., 4 cm in the example). Accordingly, even when the bottom part and the middle part of a parcel (P) are different from each other in length and/or width, an area of the parcel (P) may be accurately calculated using an actual size.

The area control module 137 may calculate an area of a parcel (P) according to a length and a width, which are measured in the detection sensors 134 and 136, and transmit a result value requested by the reception system 200 through the area communication module 131 and the communication unit 110.

The scale 138 is installed under the plate 132 and may measure a weight of a parcel (P) while measuring a length and a width and transmit a result value to the reception system 200.

The volume calculation unit 140 calculates a volume of a parcel (P) based on a height and an area (or a length and a width) received from the height measuring unit 120 and the area measuring unit 130.

In the embodiment, it is described that a volume is calculated in the object volume measuring apparatus 100. However, a height, a length/width or height, or only an area may be transmitted to the reception system 200, which may then calculate a volume.

The controller 150 controls the above-described components of the object volume measuring apparatus 100 and processes a volume measurement request and a result value through the communication unit 110, the height communication module 121 and the area communication module 131.

According to the embodiment, the object volume measuring apparatus 100 may obtain volume information of a parcel more easily and simply by being linked to an existing face-to-face reception system.

In addition, the object volume measuring apparatus 100 may realize the same function and performance as the existing technology, despite being composed of a low-cost module as a volume measurement module for parcel.

Moreover, the object volume measuring apparatus 100 may apply a short-range wireless communication method for information linking to the height measuring unit 120, enables the height measuring unit 120 to be separately installed above an existing reception device like a scale in a convenient way and thus is capable of being easily fused with an existing system.

Hereinafter, with reference to FIGS. 1 to 5, a method of measuring a volume of object according to another embodiment of the present disclosure will be described.

Figure 5:
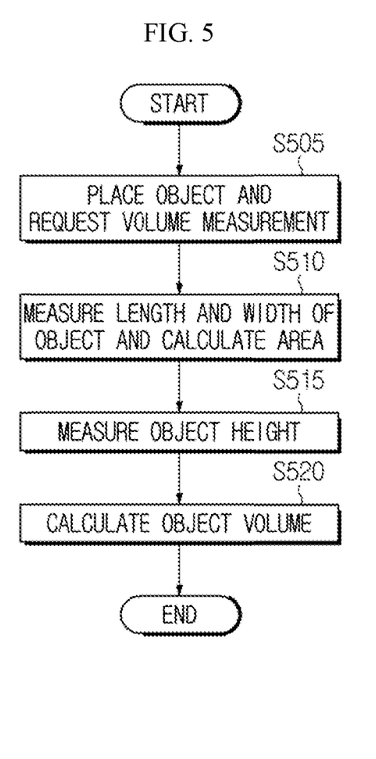
FIG. 5 is a flowchart concerning a method of measuring a volume of object according to another embodiment of the present disclosure.

FIG. 5 is a flowchart concerning a method of measuring a volume of object according to another embodiment of the present disclosure.

First, when a receptionist receives a parcel (P) through the reception system 200 and places the parcel on the plate 132 of the object volume measuring apparatus 100 that is placed near the reception system 200, the reception system 200 detects the placement and transmits a request of parcel volume measurement through the communication unit 110 (S505).

Next, the controller 150 transmits a related message according to the request to the area communication module 131, and the area control module 137 activates the lengthwise and widthwise detection sensors 134 and 136 according to the related message thus received to measure a length and a width of the parcel (P) and calculate an area (S510). At the same time, the scale 138 may measure a weight of the parcel (P).

According to an instruction from the area control module 137, when the parcel (P) is placed on the plate 132 as shown in FIG. 4, the lengthwise detection sensor 134 detects a lengthwise edge of the parcel (P). Specifically, the lengthwise detection sensor 134 detects a parcel (P) end located in the direction of lengthwise edge. According to an instruction from the area control module 137, when the parcel (P) is placed on the plate 132 as shown in FIG. 4, the widthwise detection sensor 136 detects a widthwise edge of the parcel (P). Specifically, the widthwise detection sensor 136 detects a parcel (P) end located in the direction of widthwise edge.

The area control module 137 measures length and width according to the number of the detection sensors 134 and 136 lengthwise and widthwise, in which edges are detected, and calculates an area of parcel (P) according to the measured length and width.

When a parcel (P) end covers all the detection sensors in the direction where the widthwise edge stretches, as in the example of the widthwise row 135 of FIG. 4, the area control module 137 may calculate width as a value between the number of a covered widthwise sensor 136 (the fourth sensor in FIG. 4) and the number of a widthwise sensor 136 (the fifth sensor in FIG. 5) next to the covered widthwise sensor 136. This may be applied to a case in which the detection sensors 134 and 136 are illumination sensors. For example, when the distance between detection sensors is 1 cm, the width may be calculated as the median value of 4.5 cm, the truncated value of 4 cm or the rounded value of 5 cm according to a design specification.

In addition, when the detection sensors 134 and 136 are configured as illumination sensors and a parcel (P) end covers a portion of the detection sensor 136 in the direction extending along the widthwise row 135 of FIG. 4, the area control module 137 may calculate width using the arrangement numbers of partially covered detection sensor 136 and a next detection sensor 136 not covered at all, based on the number of the covered widthwise detection sensor 136 and an illumination level of the partially covered widthwise detection sensor 136. Detailed description regarding this is provided above and is abbreviated herein.

Next, the controller 150 transmits the related message according to a request to the height communication module 121, and the height control module 123 activates the distance measuring sensor 122 according to the related message thus received and measures a height of the parcel (P) (S515).

In case the height measuring unit 120 is wireless connected to the communication unit 110, the communication unit 110 may transmit wirelessly a request-related message to the height measuring unit 120 according to a request of volume measurement.

Referring to FIG. 4, the height measuring unit 120 stores an initial distance, which is already stored, when a parcel (P) is not in the area measuring unit 130, and measures a placement distance to the top side of the parcel (P) using the distance measuring sensor 122, when the parcel (P) is placed at a volume measurement request of the reception system 200. The height measuring unit 120 calculates the height of the parcel (P) based on a difference between an initial distance and a placement distance.

Next, the volume calculating unit 140 calculates a volume of the parcel (P) based on the height and area that are received from the height measuring unit 120 and the area measuring unit 130 respectively (S520).

The volume thus calculated is transmitted to the reception system 200 via the communication unit 110. At the same time, the weight and length/width of the parcel (P) may be delivered to the reception system 200.

In this method embodiment, the step S510 for calculating an area is described to precede the step S515 for measuring a height. However, the order of the step S510 and the step S515 may be modified, and these steps may be implemented simultaneously. Also, in this method embodiment, it is illustrated that the area measuring unit 130 and the volume calculation unit 140 calculate and transmit both an area and a volume to the reception system 200. However, the object volume measuring apparatus 100 may transmit length/width or area to the reception system 200 according to a type of result value requested by the reception system 200, and the reception system 200 may calculate an area and a volume based on the result thus received.

According to the present disclosure, an apparatus and method for measuring a volume of object may be provided which more conveniently and simply obtain information on the volume of object by being linked to an existing face-to-face reception system.

According to the present disclosure, an apparatus and method for measuring a volume of object may be provided which realize the same function and performance as an existing technology, despite being composed of a low-cost module as a volume measurement module for object.

According to the present disclosure, an apparatus and method for measuring a volume of object may be provided which apply a short-range wireless communication method for information linking to a height measuring unit, enables the height measuring unit to be separately installed above an existing reception device like a scale in a convenient way and thus is capable of being easily fused with an existing system.

Effects obtained in the present disclosure are not limited to the above-mentioned effects, and other effects not mentioned above may be clearly understood by those skilled in the art from the following description.

The technical problems solved by the present invention are not limited to the above technical problems and other technical problems which are not described herein will become apparent to those skilled in the art from the above description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. An object volume measuring apparatus comprising:
an area measuring unit that comprises a detection sensor, which is arranged at predetermined spacing in a single row along lengthwise edges and widthwise edges of a plate respectively, where an object is placed, measures a length and a width according to the numbers of detection sensors lengthwise and widthwise respectively in which the edges are detected, and calculates an area of the object according to the measured length and width;
a height measuring unit that is located above the plate and comprises a distance measuring sensor for measuring a height of the object when the object is placed; and
a volume calculation unit for calculating a volume of the object based on the area and the height.

2. The object volume measuring apparatus of claim 1, further comprising
a communication unit for communicating with a reception system that requests volume measurement and receives a result value from the object volume measuring apparatus,
wherein the communication unit communicates wirelessly with the height measuring unit and transmits wirelessly a message related to the request to the height measuring unit according to the request for volume measurement.

3. The object volume measuring apparatus of claim 1, wherein the detection sensor is composed of an illumination sensor or a push sensor.

4. The object volume measuring apparatus of claim 3, wherein, when the detection sensor is an illumination sensor and an end of the object covers a portion of the detection sensor in a direction in which the edge extends, each of the length and the width is calculated, based on the number of the covered detection sensor and an illumination level of the detection sensor, of which the portion is covered, as any one value between an arrangement number of a partially covered detection sensor and an arrangement number of a next detection sensor.

5. The object volume measuring apparatus of claim 1, further comprising a scale under the plate for measuring a weight of the parcel.

6. The object volume measuring apparatus of claim 1, wherein the distance measuring sensor is composed of an ultrasonic sensor, an infrared sensor, or a ToF (Time of Flight) camera sensor.

7. A method for measuring a volume of an object, the method comprising:
measuring a length and a width by a detection sensor, which is arranged at predetermined spacing in a single row along lengthwise edges and widthwise edges of a plate respectively, where an object is placed, according to lengthwise and widthwise numbers of the detection sensor where the edges are detected, as well as calculating an area of the object according to the measured length and width;
measuring a height of the object by a distance measuring sensor that is located above the plate and measures the height of the object when the object is placed; and
calculating a volume of the object based on the area and the height.

8. The method of claim 7, wherein the measuring of the height starts, at a request for volume measurement from a reception system, by receiving wirelessly a message related to the request.

9. The method of claim 7, wherein the detection sensor is composed of an illumination sensor or a push sensor.

10. The method of claim 9, wherein, when the detection sensor is an illumination sensor and an end of the object covers a portion of the detection sensor in a direction in which the edge extends, each of the length and the width is calculated, based on the number of the covered detection sensor and an illumination level of the detection sensor, of which the portion is covered, as any one value between an arrangement number of a partially covered detection sensor and an arrangement number of a next detection sensor.

11. The method of claim 7, wherein the calculating of the area of the object comprises measuring a weight of the object by a scale that is located under the plate.

12. The method of claim 7, wherein the distance measuring sensor is composed of an ultrasonic sensor, an infrared sensor, or a ToF camera sensor.

* * * * *